(12) United States Patent
Denger et al.

(10) Patent No.: US 7,434,564 B2
(45) Date of Patent: Oct. 14, 2008

(54) INTERNAL COMBUSTION ENGINE

(75) Inventors: Dirk Denger, Graz (AT); Paul Kapus, Judendorf (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 12/010,366

(22) Filed: Jan. 24, 2008

(65) Prior Publication Data
US 2008/0149063 A1 Jun. 26, 2008

Related U.S. Application Data

(63) Continuation of application No. 11/660,367, filed on Apr. 22, 2008.

(51) Int. Cl.
F02B 19/10 (2006.01)
(52) U.S. Cl. .................. 123/275; 123/285; 123/308; 123/432
(58) Field of Classification Search ........... 123/275, 123/285, 308, 432
See application file for complete search history.

(56) References Cited

U.S. PATENT DOCUMENTS

| 1,750,063 | A | * | 3/1930 | Sorg ......................... 123/263 |
| 4,203,393 | A | * | 5/1980 | Giardini |
| 4,957,081 | A | * | 9/1990 | Ito et al. ..................... 123/302 |
| 4,974,566 | A | * | 12/1990 | LoRusso et al. |
| 5,870,993 | A | * | 2/1999 | Stellet et al. |
| 5,908,018 | A | * | 6/1999 | Suzuki ....................... 123/301 |
| 5,950,582 | A | * | 9/1999 | Stein ....................... 123/90.15 |
| 6,318,348 | B1 | * | 11/2001 | Xu .......................... 123/568.14 |
| 6,341,591 | B1 | * | 1/2002 | Tsutsumi et al. ............ 123/295 |
| 6,502,541 | B2 | * | 1/2003 | Abo et al. .................... 123/295 |

FOREIGN PATENT DOCUMENTS

| DE | 10326054 | * | 1/2005 |
| EP | 0764770 | * | 3/1997 |
| GB | 2373826 | * | 10/2002 |

\* cited by examiner

*Primary Examiner*—Erick Solis
(74) *Attorney, Agent, or Firm*—Dykema Gossett PLLC

(57) ABSTRACT

A cylinder head for an internal combustion engine wherein intake openings to the cylinder are partly surrounded by a mask formed by a material projection of the top face of the combustion chamber, a contour of the mask having a flat main section of maximum height between an ascending and descending flank and being asymmetrical in a developed view.

10 Claims, 5 Drawing Sheets

Figure 17:
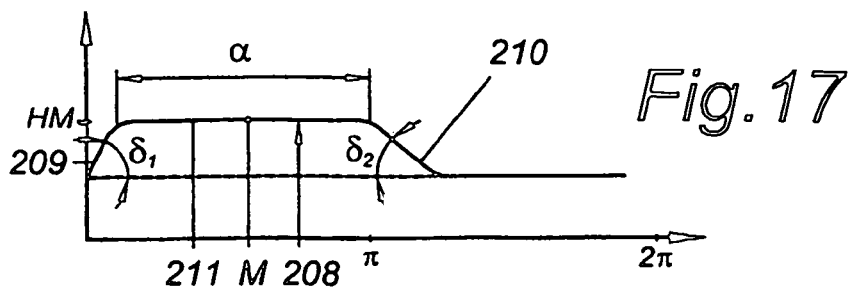

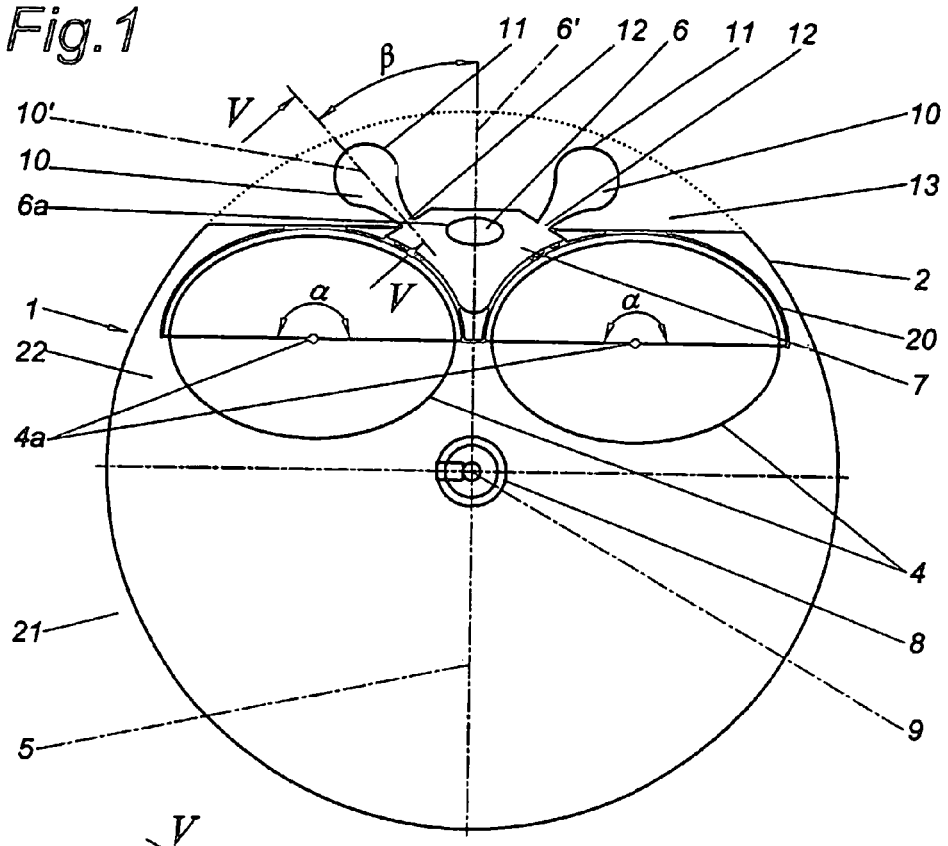
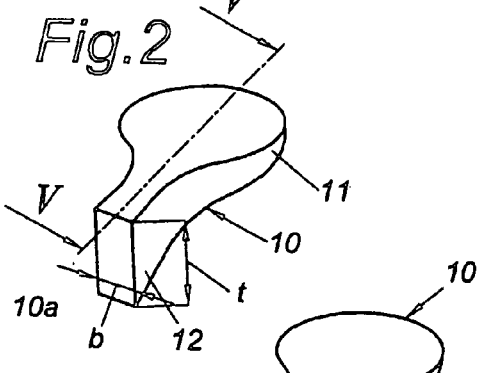
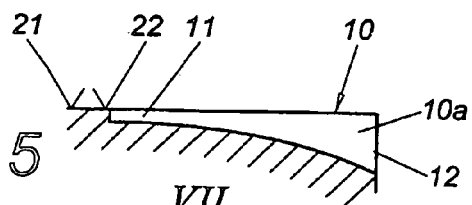
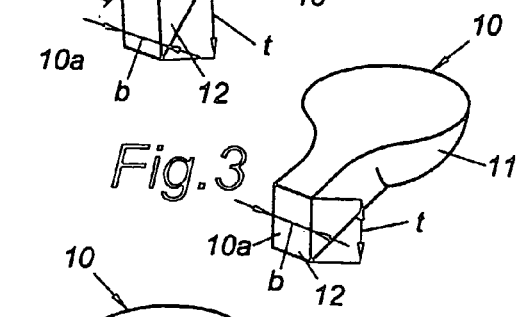
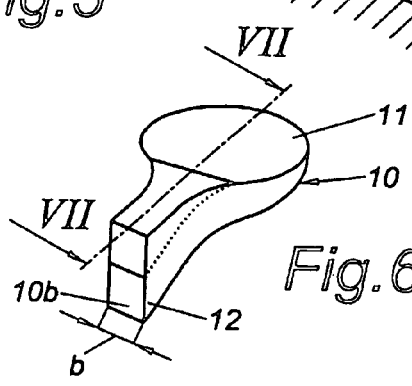
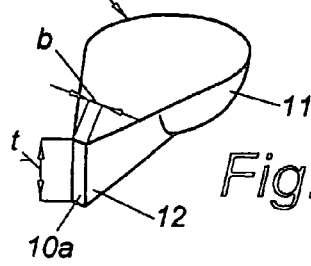
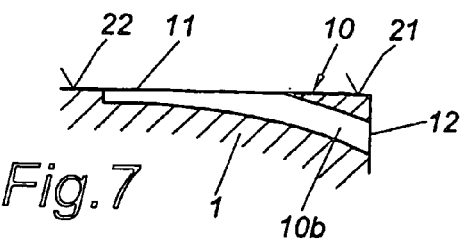

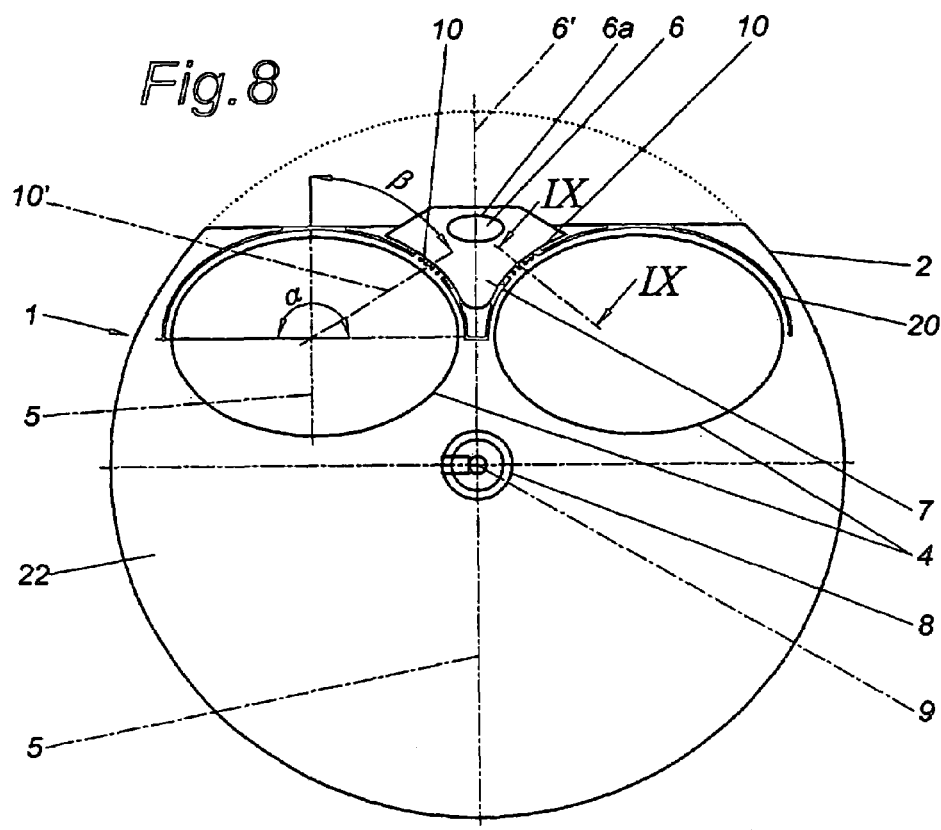
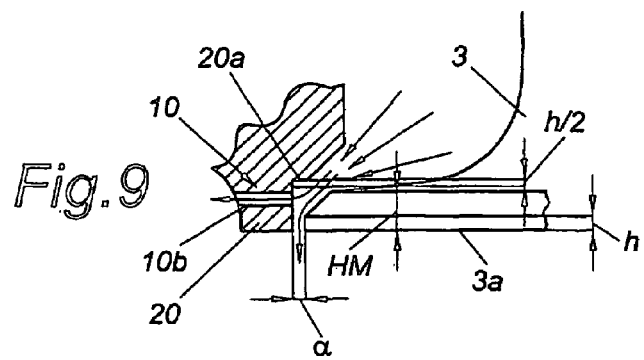
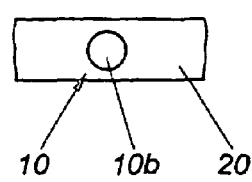
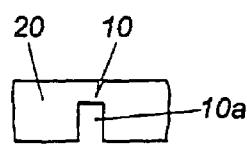
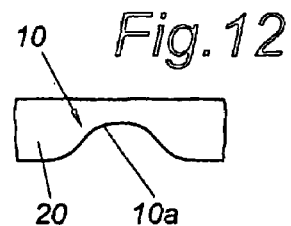

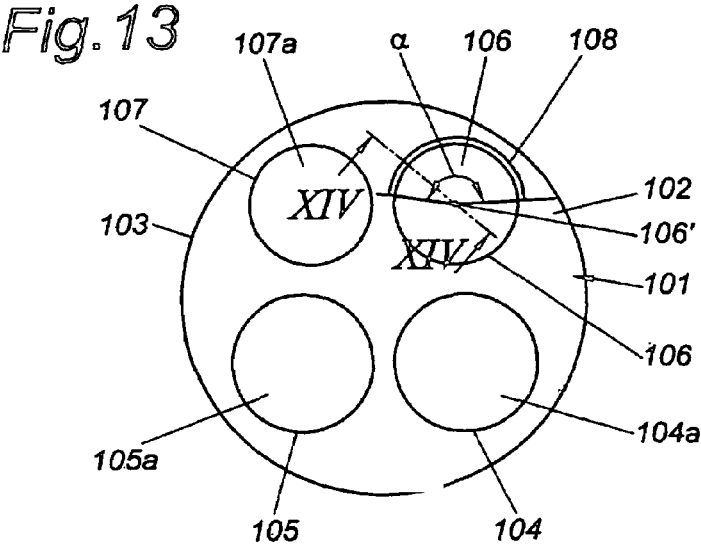
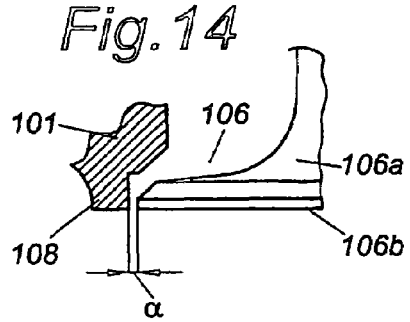
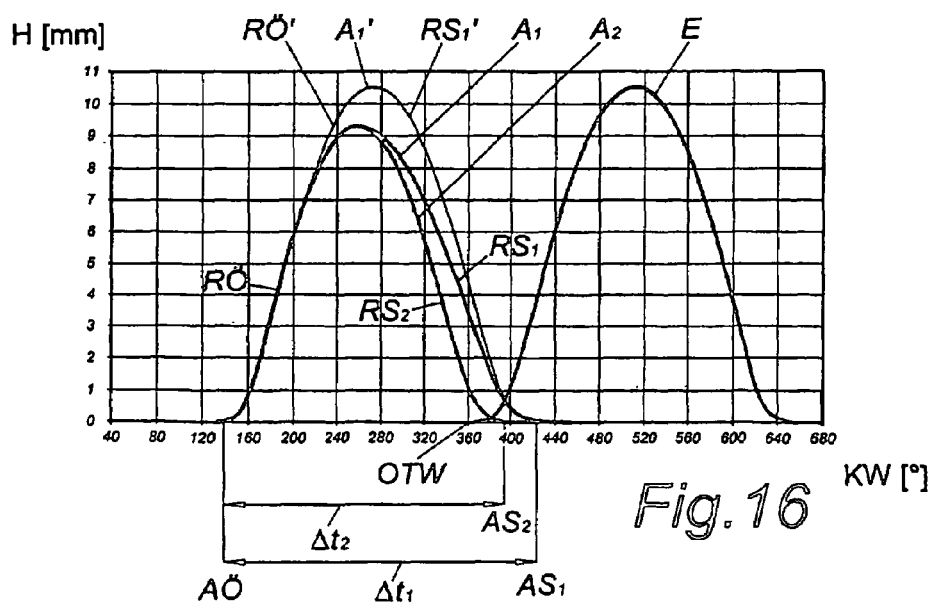

INTERNAL COMBUSTION ENGINE

The invention relates to an internal combustion engine comprising a cylinder head with at least one intake port and at least one fuel injection device per cylinder, which extends into the combustion chamber. The invention also relates to a method for operating an internal combustion engine with at least two exhaust valves per cylinder, where in at least one operating region of the engine exhaust gas is recirculated into the combustion chamber from the exhaust ports via the exhaust valves, and where a swirl flow is generated in the combustion chamber due to differing closing times of the exhaust valves. Furthermore the invention relates to an internal combustion engine comprising a cylinder head with at least two intake and two exhaust valves per cylinder, and with a valve actuating device which permits closing of the exhaust valves at different times. The invention further relates to a cylinder head for an internal combustion engine with at least two intake ports per cylinder opening into the combustion chamber, each intake port being provided with a valve seat in the area where it opens into the combustion chamber, and the openings being partly surrounded by masks formed by material projections of the top face of the combustion chamber.

From DE 103 26 054 A1 there is known an internal combustion engine with a cylinder head, an injection device injecting fuel directly into the combustion chamber, and two intake ports per cylinder, where the intake openings are provided with rib-shaped masks surrounding the disks of the intake valves semi-circularly and facing the injection nozzle. These masks deflect the combustion air flow approximately in parallel to the lateral fuel jet in order to initiate a tumble flow in the combustion chamber. In the area of the fuel jet at least one of the masks is divided by a gap, exposing the fuel jet immediately to part of the inflowing combustion air. This should increase the efficiency of the internal combustion engine and improve ignition reliability. The gap extending over the whole height of the mask will however impair the effect of the mask.

In conventional direct-injection internal combustion engines the injection device extends into the combustion chamber. The exposed situation of the injector tip causes increased wear.

From U.S. Pat. No. 6,502,541 B2 there is known an internal combustion engine in which exhaust gas can be recirculated into the combustion chamber via the exhaust valves. Internal exhaust gas recirculation is used to improve fuel consumption especially in part-load operation. To generate a swirl of the recirculated exhaust gas in the combustion chamber the exhaust valves are closed at different times. Different closing times are achieved by a phase shift in the timing of the two exhaust valves. The exhaust valves are thus also opened at different times. In order to adjust the valve timing for both valves independently of each other complex technology is required.

In U.S. Pat. No. 5,870,993 another internal combustion engine is disclosed with two intake and two exhaust valves per cylinder, in which internal exhaust gas recirculation from the exhaust ports into the combustion chamber can be achieved by shifting the lifting curves of the exhaust valves. By masks in the area of the two exhaust ports a swirl may be imparted to the recirculated exhaust gas in the combustion chamber. The masking of the two exhaust ports is disadvantageous at full load.

From EP 0 764 770 B1 there is known a cylinder head which is partially provided with masks in the area where the intake ports open into the combustion chamber, wherein the walls of the intake ports on one side of the opening are configured in such a way that the flow cross-section at low lift of the intake valve is narrowed over an angle region of approximately 180°. At low-load or part-load operation this creates a tumble flow which arises from the intake ports.

U.S. Pat. No. 4,974,566A discloses an internal combustion engine with two intake ports opening into the cylinder, whose walls are configured such that at small valve lifts the intake cross-section for the flow through the intake ports is narrowed in a region defined by a certain angle around the movement axis of the intake valve in such a way that at small valve lifts a tumble flow is generated. For large valve lifts the intake cross-section extends along the whole periphery of the valves, which permits satisfactory filling of the cylinder. In the part-load region the engine is operated with small valve lifts, thus giving good thermodynamic conditions for combustion due to the prevailing tumble flow. At full load the engine is operated with full valve lifts, thus achieving sufficient filling of the cylinder and sufficient torque.

It is the object of the present invention to minimize the above mentioned wear of the injection device in an internal combustion engine. Furthermore, the forming of deposits in the area around the entry of the injection device into the combustion chamber is to be avoided. A further aim of the invention is to achieve good fuel economy at part load without impairing full load performance. Furthermore it is an object of the invention to design a cylinder head with which combustion conditions especially at part load may be improved and emissions may be further reduced.

The invention achieves these aims by providing that the top of the combustion chamber has an injector pocket in the area where the injection device enters the combustion chamber, preferably with at least one arrangement of scavenging passages opening into the injector pocket. Scavenging air enters the injector pocket via the scavenging passage arrangement, thus preventing the formation of deposits. The method of scavenging the injector will not, or only slightly, impair the effectiveness of the masking.

In a first variant of the invention, which has no negative influence on the effectiveness of the masking, it is provided that the scavenging passage arrangement is located in the region of at least one squish surface of the combustion chamber top preferably formed by the cylinder head. Preferentially it is provided that the scavenging passage arrangement has at least one scavenging passage which starts from a flat entry area and opens into the injector pocket via a nozzle region. Advantageously the depth of the scavenging passage increases in the direction towards the injector pocket. Preferably the scavenging passage narrows in the form of a nozzle, thus causing the scavenging air to enter the injector pocket with high flow velocity. As the piston approaches upper dead center scavenging air is pressed via the squish surface into the scavenging passage arrangement and further into the injector pocket, thus cleaning out deposits from the injector pocket.

In a second variant of the invention it is provided that the scavenging passage arrangement departs from an intake port, preferably from the valve seat area of the intake port. If at least one intake port is furnished with a mask, it is of particular advantage if the scavenging passage arrangement is formed into the mask. Advantageously in this case at least one scavenging passage is positioned essentially radially relative to the intake port between the intake port and the entry point of the injection device.

In a particularly simple variant of the invention it is provided that the scavenging passage has a cross-section which is open towards the combustion chamber and is configured preferably as a slot or a groove. The slot or groove may be machined into the cylinder head in a simple manner. It is also possible, however, that the scavenging passage at least partly has a closed cross-section and is preferably formed by a bore. Preferentially it is provided that the scavenging passage arrangement has a certain distance from the bottom of the mask. The effective mechanism of the mask will be much less impaired by this measure than by a gap in the mask extending over its whole height, as shown in DE 103 26 054 A1.

It is provided by the invention that the longitudinal axis of at least one scavenging passage forms an angle greater than 0°, preferably between 30° and 60°, with a plane defined by the cylinder axis and the axis of the injection device.

To achieve a sufficient swirl effect it is advantageous if the mask extends around the intake port over an angle of 150° to 180°. In this instance the height of the mask should be between 1.5 mm and 4 mm. Preferably it is provided that the distance from the mask to the rim of the valve disk is about 0.3 mm to 0.7 mm.

To improve on fuel consumption at part load without impairing full-load performance it is proposed that the two exhaust valves be opened for differing lengths of time, both exhaust valves preferably opening at the same time. Via a phase adjuster the opening point of the exhaust valves may be shifted synchronously. In the case of cam-controlled operation in particular, it may be provided that the exhaust valves have exhaust valve lift curves of differing length.

The invention is also suitable for cam-less operation, however.

By simultaneously opening both exhaust valves a relatively large volume of exhaust gas may be fed into the exhaust ports at the beginning of the exhaust stroke. In this way a favourable emptying behaviour of the combustion chamber may be achieved with minimal throttling losses. This will result in a high power yield, especially at full load.

In the context of the invention it is provided that the difference between the closing points of the exhaust valves is 10° to 80° of crank angle, and preferably 20° to 60° of crank angle, a first exhaust valve preferably being closed immediately after upper dead center of the charge exchange process and a second exhaust valve being closed at 20° to 60° crank angle after upper dead center of the charge exchange process. The closing point is here defined as that point in time at which the exhaust valve has a residual lift of 1 mm. Differing closing points will cause swirl to be generated when exhaust gas is sucked back into the cylinder from the exhaust duct. To achieve strong swirl components it is advantageous if the recirculated exhaust gas is guided over a flow guiding surface formed by a mask in the area of at least one exhaust valve. The mask may be provided in the area of one exhaust valve only. In this way flow losses during outflow from the cylinder at full load may be kept small. In order to achieve a sufficient swirl effect it is advantageous if the mask extends around the center of the exhaust port through an angle of approximately 150° to 180°. The height of the mask should be 1.5 mm to 4 mm. Preferably it is provided that the distance of the mask from the rim of the valve disk is 0.3 mm to 0.7 mm approximately.

The different closing times of the exhaust valves may be realised by an asymmetrical shape of the cam of at least one exhaust valve. Preferentially it is provided that each exhaust valve is actuated by its own cam, with the cams having different closing flanks. Furthermore it may be provided that the cams have identical opening flanks and/or identical maximal cam lobes.

In addition, the swirl in the combustion chamber due to the intake flow from the intake ports can be increased by asymmetrical intake ports, one intake port being preferably configured such that it can be closed down.

Combustion conditions and emissions can be improved if the contour of the mask of at least one intake port has a flat main part of maximum height between an ascending and a descending flank and in a developed view is of asymmetrical shape, ascending and descending flanks preferably having different slope angles.

It is particularly advantageous if the flank of the profile closer to the combustion chamber wall has a smaller slope than the flank nearer to the center of the combustion chamber. The intake flow may thus be specifically guided to a central cylinder region generating a tumble flow in the direction of the piston axis.

It has been found by experiments that a particularly high stability of combustion can be attained if the mask of each port extends over an angle of 120° to 210°, measured around the center of the port opening, and preferably over an angle between 160° and 180°. Preferentially it is provided that at each port a main axis running approximately through the middle of the main part of the mask forms an angle of 70° to 120°, preferably between 80° and 110°, with a straight reference line running through the centers of the port openings.

The height of the mask is chosen such that at partial valve lift the opening of each intake port is laterally covered on the intake side. At full valve lift the intake valve is beyond the mask and the full intake cross-section is available. The height of the mask is 1.2 mm to 3.5 mm approximately, and preferably 1.6 mm to 2.5 mm, and even more preferably 1.6 mm to 2.2 mm. In order to avoid heavy throttling of the intake flow especially under full load it is of advantage if a clearance is provided between the mask and the valve disk, which should not exceed a quarter of the height of the mask, preferably.

In a particularly preferable variant of the invention it is provided that the depth of the injector recess is at most about equal to the height of the mask. By positioning the injector orifice in the area of the injector recess of the mask, the injector nozzle may extend relatively deeply into the combustion chamber. The depth of the injector recess will thus correspond to the height of the mask at most. It is furthermore of advantage if the injector recess is at a distance from the wall of the mask, this distance being at least 1 mm. This minimum distance between injector recess and wall of the mask will avoid negative influence on the intake flow.

Figure 18:
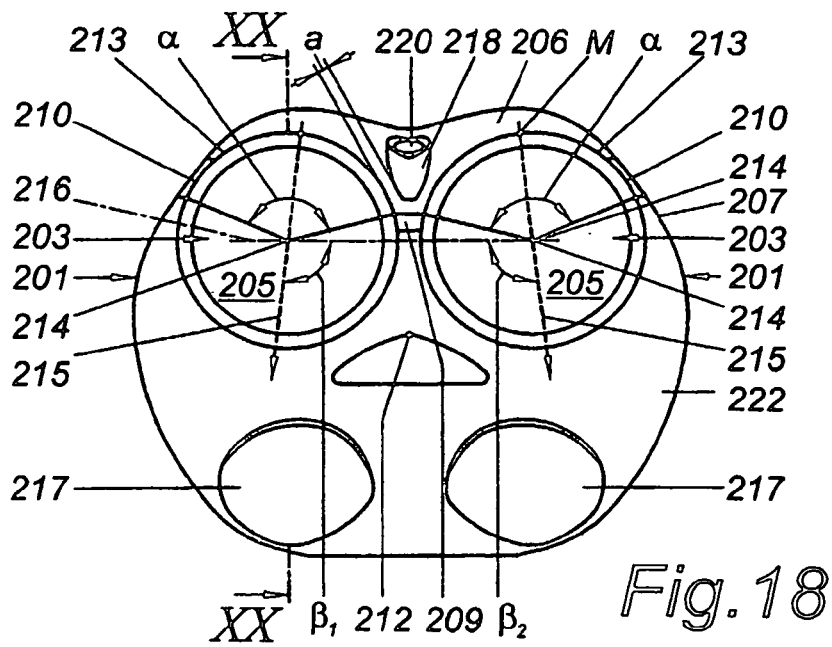
Figure 19:
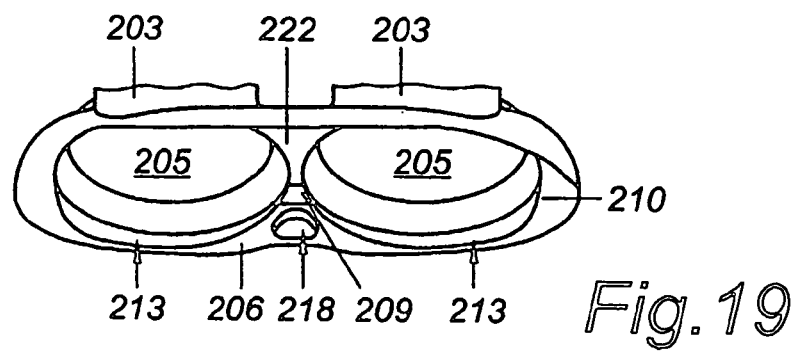
Figure 20:
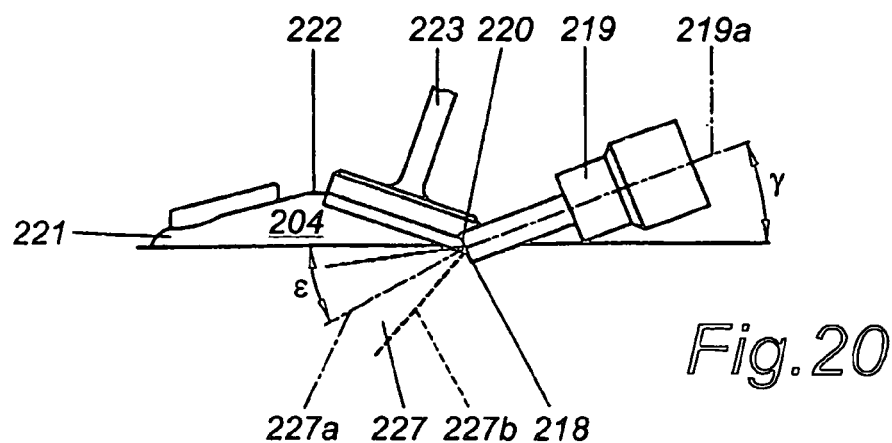
Figure 21:
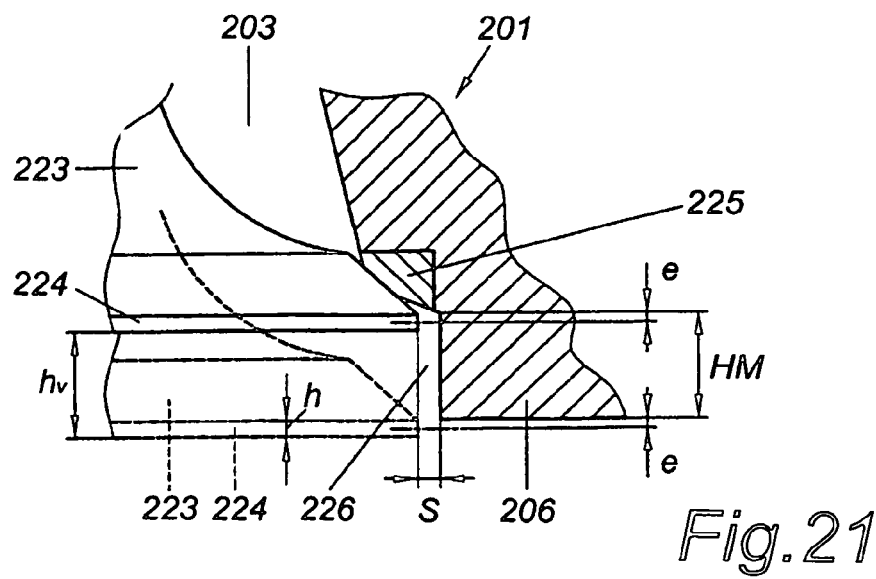

The invention will now be described in more detail with reference to the enclosed drawings. There is shown in FIG. 1 a cylinder head of an internal combustion engine according to the invention in a first variant, as seen from the side of the combustion chamber;

FIG. 2 a scavenging passage arrangement of an internal combustion engine according to the invention in an oblique view, in a second variant;

FIG. 3 a scavenging passage arrangement of an internal combustion engine according to the invention in a third variant;

FIG. 4 a scavenging passage arrangement of an internal combustion engine according to the invention in a fourth variant;

FIG. 5 a scavenging passage arrangement in a section along line V-V of FIG. 1 and FIG. 2;

FIG. 6 a scavenging passage arrangement of an internal combustion engine according to the invention in a fifth variant, in an oblique view;

FIG. 7 the scavenging passage arrangement of FIG. 6 in a section along line VII-VII of FIG. 6;

FIG. 8 a cylinder head of an internal combustion engine according to the invention in a sixth variant, as seen from the side of the combustion chamber;

FIG. 9 the cylinder head in a section along line XI-XI in FIG. 8;

FIG. 10 a variant of a scavenging passage in cross-section;

FIG. 11 another variant of a scavenging passage in cross-section;

FIG. 12 a further variant of a scavenging passage in cross-section;

FIG. 13 the valves of a cylinder head of an internal combustion engine according to the invention;

FIG. 14 the cylinder head in a section along line XIV-XIV of FIG. 13 with the exhaust valve opened;

FIG. 15 the cylinder head in a section analogous to that of FIG. 14 with the exhaust valve closed;

FIG. 16 a valve lift/crank angle diagram;

FIG. 17 the developed contour of the mask of an intake port;

FIG. 18 the cylinder head according to the invention as seen against the combustion chamber top face;

FIG. 19 an oblique view of the openings of two intake ports of the cylinder head;

FIG. 20 the cylinder head in a section along line XX-XX of FIG. 18; and in FIG. 21 the mask in a section detail analogous to FIG. 20;

Parts with identical function are referred to by identical reference numerals.

FIG. 1 shows a cylinder head 1 of an internal combustion engine as seen from inside the combustion chamber. The cylinder head 1 has for each cylinder 2 two intake ports 4 served by intake valves 3. The exhaust ports are not shown in the figures to keep the drawings uncluttered.

In the area of a transversal plane 5 between the intake ports 4 an injection device 6 enters the combustion chamber. The axis 6' of the injection device 6 is inclined relative to the cylinder axis 9. In the entry area or mouth 6a of the injection device 6 an injector pocket 7 is located in the cylinder head 1. An ignition device in the area of the cylinder axis 9 is indicated by reference numeral 8.

The intake ports 4 are partly screened by masks 20 in order to initiate a tumble flow in the combustion chamber. The mask 20 extends through an angle α of between 150° and 180° around the center 4a of the intake port 4. The height HM of the mask 20 is 1.5 mm to 4 mm—as measured from half the height h of the valve disk rim 3a of the closed intake valve 3. The distance a between the mask 20 and the valve disk rim 3a is 0.3 mm to 0.7 mm. Due to the mask 20 deposit-prone regions with low local flow velocities occur in the area of the injector pocket 7, especially between the intake ports 4 and the injector entry 6a.

To combat these deposits an arrangement of scavenging passages 10 is provided for each intake port 4, which open into the injector pocket 7. The scavenging passage arrangements 10 presented in FIGS. 1 to 7 comprise at least one scavenging passage 10a, an inlet region 11 and a nozzle region 12 each. The inlet region 11 has small depth t but relatively large width b and is located in the area of a squish surface 13 of the top face 22 of the combustion chamber formed by the cylinder head 1. The width b of the scavenging passage arrangement 10 decreases towards the nozzle region 12 and attains its minimum at the opening into the injector pocket 7. The depth t increases continuously from the inlet region 11 towards the nozzle region 12 and attains its maximum at the opening into the injector pocket 7. In plan view the arrangement 10 of scavenging passages may be pear-shaped, club-shaped or bat-shaped as seen in FIGS. 2 to 4 and 6. In the variants shown in FIGS. 2 to 5 the scavenging passage 10a of the scavenging passage arrangement 10 has a cross-section that is open towards the combustion chamber. Alternatively, the scavenging passage 10b of the scavenging passage arrangement 10 may have a closed cross-section, as shown in FIGS. 6 and 7, and may be inclined relative to the plane 21 of the cylinder head gasket.

As the piston of the internal combustion engine, which is not shown in the drawings, approaches upper dead center, the gas enclosed in the combustion chamber is pressed by the squish surfaces 13 into the inlet region 11 of the scavenging passage arrangement 10 and flows through the scavenging passage 10a or 10b into the injector pocket 7, carrying off deposits due to the high flow velocity.

The variants shown in FIGS. 8 and 9 differ from the variant described above by the scavenging passage arrangement 10 being located in the area of the intake port 4 in the form of an opening in the mask 20. The scavenging passage arrangement 10 may in this case have at least one scavenging passage with closed cross-section, for instance formed by a bore 10b (FIG. 10), and/or at least one scavenging passage 10a with a cross-section open towards the combustion chamber (FIGS. 11, 12). The open scavenging passage 10a may be formed by a slot (FIG. 11) or a groove (FIG. 12) at a certain distance from the bottom 20a of the mask 20. In this variant the scavenging passage arrangement 10 is positioned between the entry 6a of the injector device 6 and the intake port 4.

When the intake valve 3 opens scavenging air can flow through the scavenging passage 10a, 10b from the intake passage into the injector pocket 7, removing deposits from the injector pocket 7.

The longitudinal axis 10' of the scavenging passage arrangement 10 forms a angle β of 30° to 60° with a transversal plane 5.

FIG. 13 shows a cylinder head 101 in a view from the combustion chamber towards the cylinder head bottom 102 of a cylinder 103. For each cylinder 103 two intake ports 104, 105 and two exhaust ports 106, 107 open into the combustion chamber, which is not otherwise visible. Via the intake ports 104, 105 the combustion chamber communicates with intake passages and via the exhaust ports 106, 107 with exhaust passages, neither of which are shown in the drawing. The intake ports 104, 105 respectively the exhaust ports 106, 107 are controlled by intake valves 104a, 105a, respectively by exhaust valves 106a, 107a.

To improve on fuel consumption, in particular when the internal combustion engine operates at part load, internal exhaust gas recirculation may be used. Such internal exhaust gas recirculation is realized by sucking back exhaust gas from the exhaust passages into the combustion chamber subsequent to the exhaust stroke near upper dead center OTW of the gas exchange phase. In this instance a strong swirl is desirable in the combustion chamber in order to improve combustion conditions and emissions. This swirl is generated by closing the exhaust valves 106a, 107a at differing points in time. A further increase of swirl may be achieved by a mask 108 in the area of at least one exhaust port 106. In order to keep the flow losses small at full load during outflow from the cylinder 103, the mask 108 is placed only in the area of one exhaust port 106. Preferably the mask 108 is located at the exhaust port 106 of the exhaust valve 106a with prolonged opening time. It extends over an angle α of 150° to 180° around the center 106' of the first exhaust port 106. The height HM of the mask 108 is 1.5 mm to 4 mm, as measured to half the height h of the valve disk rim 106b. The distance a between the mask 108 and the valve disk rim 106b is 0.3 mm to 0.7 mm.

FIG. 16 shows a diagram of valve lift H over crank angle KW, in which the valve lift curve of the intake valves 104a, 105a is designated by E. $A_1$ is the valve lift curve of the first exhaust valve 106a, i.e. resulting from asymmetrical lifting, $A_2$ is the valve lift curve of the second exhaust valve 107a. The opening flanks RÖ of the first exhaust valve 106a and the second exhaust valve 106a are identical. The closing point $AS_2$ of the second exhaust valve 107a, which differs from that of the first exhaust valve 106a, is realized by an asymmetrical shape of the closing flank $RS_1$ of the first exhaust valve 106a, relative to the opening flank. $RS_2$ designates the closing flank of the second exhaust valve 107a. The different closing points $AS_1$ and $AS_2$ of the first and second exhaust valve 106a, 107a together with the common opening point AÖ result in different opening periods $\Delta t_1$ and $\Delta t_2$.

The valve lift curve $A_1'$ shows a variant in which the closing point $AS_1$ of the first exhaust valve 106a also is later than the closing point $AS_2$ of the second exhaust valve 107a. In this case however opening and closing flank RÖ' and $RS_1'$ of the valve lift curve $A_1'$ are symmetrical. Here, too, different opening periods $\Delta t_1$ and $\Delta t_2$ of the first and second exhaust valves lead to swirl formation in the combustion chamber.

The opening point AÖ is the same for both exhaust valves 106a, 107a. By synchronously opening the exhaust valves 106a, 107a at the beginning of the exhaust stroke, high mass flow through the exhaust ports 106, 107 into the exhaust duct is made possible, which is of particular importance at full load operation. Throttling losses can thus be kept small and a power drop at full load is avoided.

A cylinder head 201 has for each cylinder 202 two intake ports 203 opening into a combustion chamber 204. The openings 205 of the intake ports 203 are at least partially surrounded by masks 206 formed by the cylinder head 201, which are located on the intake side between the openings 205 of both intake ports 203 and the wall of the combustion chamber 207. The purpose of the mask 206 is to enhance the intake tumble flow and to direct it towards one side of the combustion chamber.

In FIG. 17 the contour 208 of the wall 213 of the mask 206 of an opening 205 is shown in a developed view. Between two flanks 209, 210 the contour has a main section 211 with maximum height HM. The contour 208 of the mask 206 is asymmetrical, one of the two flanks 209, 210, i.e. flank 210 nearest to the cylinder rim 207, having a smaller slope—defined by the angle $\delta_2$—than the other flank 209 nearer to the cylinder center 212. The slope angle of the other flank 209 is designated 61.

The main section 211 of the wall 213 of the mask 206 extends around the center 214 of the exhaust port over an angle α between 120° and 210°, with best results being obtained with an angle between 160° to 190°.

The direction 215 of the mask 206 is defined by a main axis 215 running through the center M of the main section 211 of the wall 213 and the valve center 214. The direction angle $\beta_1$, which is formed by the main axis 215 and a reference line 216 through the valve centers 214, has a value approximately between 70° and 120°, preferably between 80° and 110°. This will achieve an optimally developed tumble flow and particularly good mixture preparation.

Reference numeral 217 designates the openings of the exhaust ports.

On the intake side an injector recess 218 is provided in the mask 206 between the openings 205 of the intake ports 203, the distance a' between recess 218 and wall 213 being at least 1 mm, and with the symmetry axis 219a of the injection valve 219 forming an angle γ of 200 to 300 with the cylinder head plane 221. It is essential that the jet cone 227b of the injection jet 227 is distinctly kept away from the combustion chamber top 222 and the cylinder wall. The center line 227a of the injection jet 227 may also be slightly inclined against the symmetry axis 219a of the injection valve 219. The angle ε between the symmetry axis 227a of the injection jet 227 and the combustion chamber top 222 is roughly 33° to 40°. Due to this configuration the injector tip 220 may extend fairly deeply into the combustion chamber 204, which will permit precise fuel injection and will avoid wetting of the combustion top face 222, of the opposite combustion chamber wall and of the intake valves 223.

The maximum height HM of the mask 206 is between 1.2 mm and 3.5 mm approximately and is chosen such that at partial lift of the intake valve 223 the intake opening between valve disk 224 and valve seat 225 is essentially covered laterally except for a clearance 226 forming a gap S. The gap S may have a width of 0.2 mm to 0.6 mm, preferably a quarter of the height HM of the mask 206 at most. When the valve lift $h_v$ of the intake valve 223 exceeds 2.0 mm approximately, the intake opening is freed also on the side of the mask 206, permitting maximum filling of the cylinder especially at full load. In FIG. 21 the dotted lines show the maximum possible valve lift of the intake valve 223 at which the intake gap S between valve disk 224 and valve seat 225 will still be just covered by the mask 206. The height of the valve disk rim is designated h. In the position shown the intake valve 223 extends beyond the mask by e=h/2. The height HM of the mask is thus the predefined valve lift $h_v$ plus half the height h of the valve disk rim.

It is of particular advantage if the cylinder head 201 is furnished with a device which permits valve lift to be fully variable, in which case the merits of the mask 206 can be fully exploited.

The invention claimed is:

1. Cylinder head for an internal combustion engine with at least two intake ports per cylinder opening into a combustion chamber, and per intake port with a valve seat located in the area of an opening, where the openings are partly surrounded by a mask formed by a material projection of the combustion chamber top face, wherein a contour of the mask of at least one opening has a flat main section of maximum height between an ascending and a descending flank and is asymmetrical in a developed view.

2. Cylinder head according to claim 1, wherein the ascending and the descending flanks of the contour have different slopes.

3. Cylinder head according to claim 1, wherein the flank of the contour nearer a wall of the combustion chamber has a smaller slope angle than a flank nearer a center of the combustion chamber.

4. Cylinder head according to claim 1, wherein the mask per opening extends around the center of the opening through an angle of approximately 120° to 210°.

5. Cylinder head according to claim 1, wherein for each opening a main axis running through the middle of a main section of the mask forms a direction angle of 70° to 120°, with a reference line through the centers of the openings.

6. Cylinder head according to claim 1, wherein a height of the mask is about 1.2 mm to 3.5 mm.

7. Cylinder head according to claim 1, wherein there is a clearance between the mask and a disk of a lifting valve, which amounts to one fourth of the height of the mask at most.

8. Cylinder head according to claim 1, wherein an injection device enters in the area of the mask between openings, the mask having an injection recess in a region of an injector tip.

9. Cylinder head according to claim 1, wherein a depth of the injection recess corresponds to about the height of the mask at most.

10. Cylinder head according to claim 1, wherein the injection recess has a certain distance from a wall of the mask, this distance being at least 1 mm.

* * * * *